United States Patent [19]

Yamada et al.

[11] Patent Number: 5,213,417
[45] Date of Patent: * May 25, 1993

[54] APPARATUS FOR TEMPERATURE MEASUREMENT

[75] Inventors: Takeo Yamada; Mitsuya Otonari; Masaru Yoshida; Naoki Harada; Shuichi Takano; Shinichiro Ohtaka, all of Kawasaki, Japan

[73] Assignee: NKK Corporation, Tokyo, Japan

[*] Notice: The portion of the term of this patent subsequent to Feb. 18, 2009 has been disclaimed.

[21] Appl. No.: 758,606

[22] Filed: Sep. 12, 1991

Related U.S. Application Data

[63] Continuation of Ser. No. 508,800, Apr. 12, 1990, Pat. No. 5,088,836.

[30] Foreign Application Priority Data

Aug. 21, 1989 [JP] Japan .................. 1-213058
Sep. 27, 1989 [JP] Japan .................. 1-249278

[51] Int. Cl.⁵ .................. G01K 7/22; G01K 1/14
[52] U.S. Cl. .................. 374/183; 374/185; 374/208; 338/22 R
[58] Field of Search .......... 374/183, 185, 208; 338/22 R; 136/221

[56] References Cited

U.S. PATENT DOCUMENTS

| | | | |
|---|---|---|---|
| 2,484,585 | 10/1949 | Quinn | 374/185 |
| 3,008,331 | 11/1961 | Chase | 374/185 |
| 3,412,359 | 11/1968 | Schwyn et al. | 374/185 |
| 4,265,117 | 5/1981 | Thoma et al. | 374/185 |
| 4,332,081 | 6/1982 | Francis | 374/185 |
| 4,424,507 | 1/1984 | Nagai et al. | 338/22 R |
| 4,770,545 | 9/1988 | Takada et al. | 374/185 |
| 4,859,081 | 8/1989 | Kabayashi | 374/179 |
| 4,906,918 | 3/1990 | Ito et al. | 374/183 |

FOREIGN PATENT DOCUMENTS 2619210 2/1989 France .
63-133030 6/1988 Japan .

Primary Examiner—William A. Cuchlinski, Jr.
Assistant Examiner—Diego F. F. Gutierrez
Attorney, Agent, or Firm—Frishauf, Holtz, Goodman & Woodward

[57] ABSTRACT

A temperature measuring apparatus consisting of a sensing element, a retaining element which retains the sensing element and which is made of a thermally conductive and electrically insulative material, a holding element which holds the retaining element, and a contact mechanism which elastically contact the retaining element with the top of the surface of the measured body. The sensing element is composed of a thin film thermistor formed on the electrically insulating layer on a substrate. A film having the thermally conductive and electrically insulative material may be inserted between the measured body and the contact area of the retaining element. The retaining element is composed of the polyimide film and a flexible copper lead foil formed on the film and connected to the electrodes of the sensing element. The contact mechanism is composed of a pressing frame with at least one pressing arm which presses the contact part of the retaining element to the measured body and which is located adjacent to the contact zone.

6 Claims, 13 Drawing Sheets

FIG. 4A
FIG. 4B
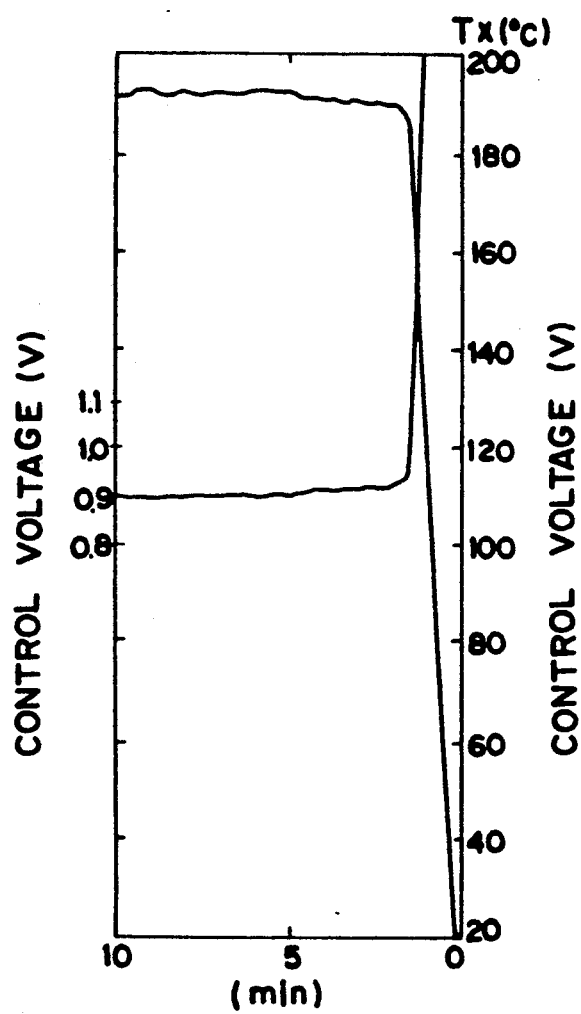
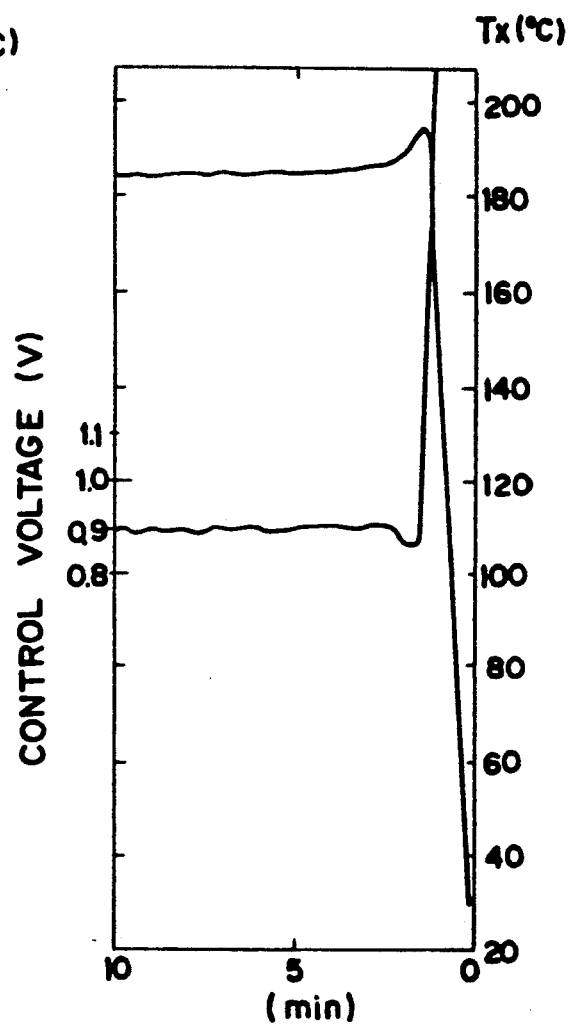

APPARATUS FOR TEMPERATURE MEASUREMENT

This is a continuation of application Ser. No. 07/508,800, filed Apr. 12, 1990, now U.S. Pat. No. 5,088,836.

BACKGROUND OF THE INVENTION

1. Field of the Invention

The invention relates to the field of temperature measurement, and particularly to the temperature measurement of the surface of bodies.

2. Description of the Prior Art

The prior art of the temperature measurement of the surface of bodies can be classified into two types, contacting and non-contacting types, for the measuring of running or stationary bodies, in the temperature range of from ambient to 200° C., by using comparatively small and low cost devices.

FIGS. 2A and 2B show a contacting temperature measurement apparatus which utilizes a bead type thermistor.

As is shown in FIG. 2A, the sensing element 51, composed of a bead type thermistor, is connected to the lead wires 50 and contacted to the measured body. In case of FIG. 2B, the sensing element 51 shown in FIG. 2A is attached to a heat resistant soft plastics member 52 and a heat conducting plate 53 composed of thermally conductive and electrically insulating material is attached to a sensing element and these parts are wrapped around by the polyimide tape 54. The temperature measurement is carried out by conducting heat from the measured body to the sensing element via the heat conducting plate 53. The sensing element in both cases is small in size, about 1 mm, and has good sensitivity. However the element shown in FIGS. 2A and 2B, is not applicable in the case where the measured body or the element is easily damaged by the measurement.

As for the non-contacting type, the sensing elements are placed at a certain distance from the measured body.

Therefore this type of measurement apparatus receives the heat from the measured body via an air gap between the sensing element and the measured body.

These prior apparatuses have the following shortcomings.

As for the contacting type:

The sensing elements should be pressed to the measured body with a certain force to carry out the proper measurement, which may cause damage to the element.

As for the non-contacting type:

1. The thermal responsiveness is hampered by the air gap.
2. The accuracy of the measurement is determined by the size of the air gap, that is, the larger the size the lower the accuracy, and the smaller the size the larger the chance of damage.

BRIEF SUMMARY OF THE INVENTION

It is an object of the invention to provide an apparatus for temperature measurement.

It is an object of the invention to provide an apparatus for temperature measurement wherein the apparatus contacts with the surface of the measured body which may be stationary or moving.

According to the invention the temperature measurement comprises a sensing means, a retaining element which retains the sensing element and which is made of a thermally conductive and electrically insulative material, a holding element which holds the retaining element, and a contact mechanism which elastically contacts the retaining element with the surface of the measured body.

The sensing element comprises a thin film thermistor formed on the electrically insulating layer on a substrate.

The contact mechanism elastically contacts the retaining element on top of the surface of the measured body.

A film having the thermally conductive and electrically insulative material may be inserted between the measured body and the contact zone of the retaining element. The width of the retaining element at the contact zone is larger than at the zone other than the contact one. The retaining element comprises of a polyimide film and a flexible copper lead foil formed on the film and connected to the electrodes of the sensing element. The area of the foil at the contact zone is larger than at the zone other than the contact one. The contact mechanism comprises a pressing frame with at least one pressing arm which presses the contact part of the retaining element to the measured body and which is located adjacent to the contact area. The pressing frame may be engaged with the retaining element to make up a single element.

BRIEF EXPLANATION OF THE DRAWINGS

FIGS. 4A to 4D are graphs of the overshooting of various apparatus.

DESCRIPTION OF THE PREFERRED EMBODIMENT

The present invention for the measurement of the temperature at the surface of the measured body will be explained in detail in the following embodiments.

(A) The sensing element

Figure 5A:
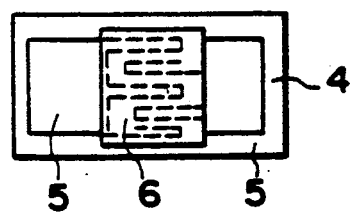
FIGS. 5A and 5B are schematic illustrations of an embodiment of the sensing element of the apparatus.
Figure 5B:
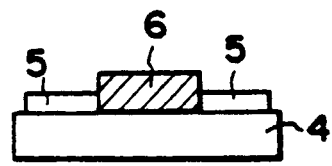

FIGS. 5A and 5B are the schematic illustrations of the embodiments of the sensing element, that is, a thermistor, wherein FIG. 5A is the plan and FIG. 5B is the sectional view.

In these Figures the substrate 4 utilizes a silicon wafer which forms an electrically insulating barrier with an oxide layer. The thin film thermistor is formed by making the electrode 5 having good electrical conductivity and the oxide thermister 6, by the process of photolithography and sputtering. The shape of the electrode 5 is formed as two combs facing each other and with the teeth thereof placed in overlapping fashion with a spacing among the facing teeth. The layer of the oxide thermistor is placed on the comb. However the shape of the electrode is not limited to the combs. The dimensions of the substrate are, e.g.; 0.525 mm in thickness, $3.2 \times 1.6$ mm$^2$ in area. A key feature of the thermistor is the very thin thickness of the oxide layer; about 1 micron meter.

(B) The retaining element

Figure 6A:
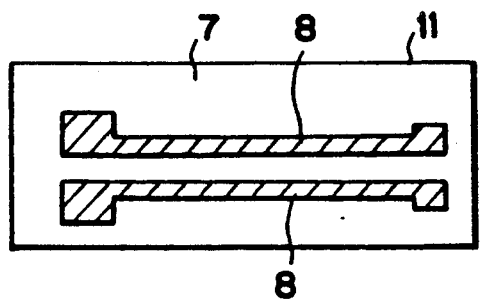
FIG. 6A is a schematic illustration of an embodiment of the retaining element of the apparatus.
Figure 6B:
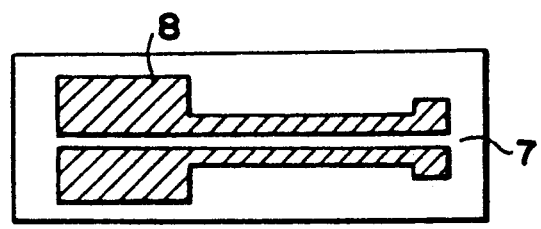
FIGS. 6B to 6H are schematic illustrations of the flexible leading bus assembly.
Figure 6C:
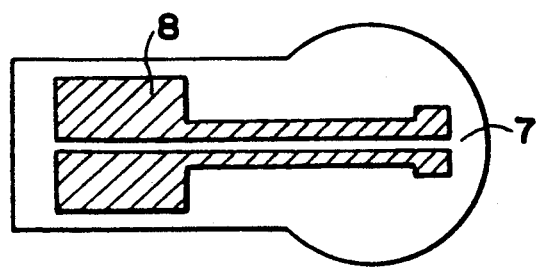

FIG. 6A is the schematic illustrations of the embodiments of the retaining element. The leading bus assembly 7 is formed by placing the leading bus 8 made of copper foil on top of the heat resistant polyimide film 11 with a thickness of 25 to 50 micrometers. The thickness of the film is preferably in the range of 25 to 50 micron meter. The elasticity thereof is enhanced and is favorable to the good contact thereof to the measured body but the thermal responsiveness is worsened, by increasing the film thickness. The film thickness is to be 25 to 50 micron meters in consideration of the above-mentioned conditions. The material is to have no influence on the thermal responsiveness of the sensing element, e.g. polyimide. The location of the film is to be apart from the position which has an influence on the thermal responsiveness of the sensing element.

It is possible to procure the good contact of the retaining element with the measured body by considering the weight, elastic strength, and structure of the retaining element, with the thickness of 25 to 50 micron meters as shown in the examples of FIGS. from 1A to 1H.

The required properties of the retaining element is the possession of the elasticity to make a soft elastic contact of the retaining body to the measured body by applying a weight or some means of pressing the retaining element equivalent to the weight. Of course the property of heat resistance is required for the retaining element. The soft elastic contact means that the contact is softer than that of the conventional contacting type of the apparatus of temperature measurement but harder than that of the non-contacting type of the prior art.

In the conventional contacting type apparatus, the contact force is around 100 grams, which causes damage to the measured body when the measured body is soft, as damage to the sensing element when the measured body is hard.

Figure 6D:
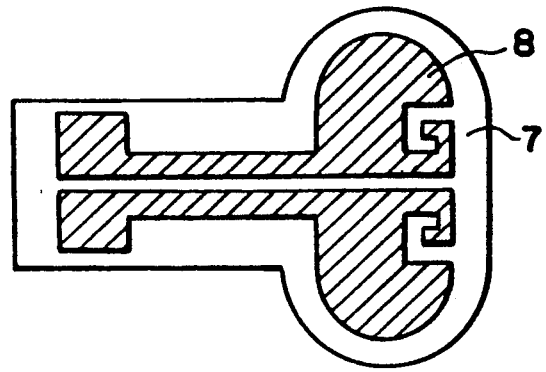
Figure 6E:
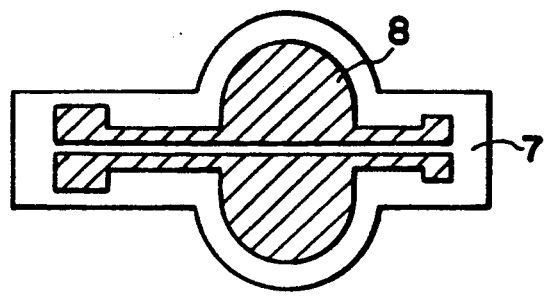
Figure 6F:
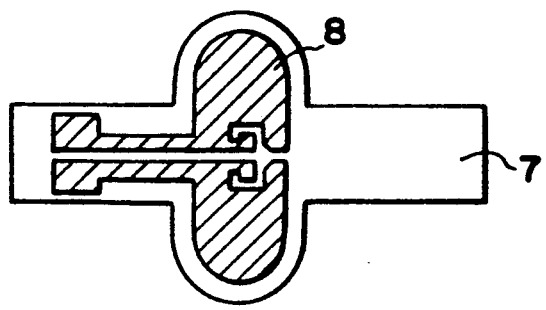

In the soft contact apparatus of the present invention, the contact force is below 5 grams, which causes no damage. Good responsiveness at comparatively elevated temperature can be procured. FIGS. 6B to 6H are the schematic illustrations in which the various shapes of the flexible leading bus assembly 7 are shown, on the surface of which is formed the leading bus 8 by etching a copper foil plated on the polyimide film 11. FIG. 6H is the side view of FIG. 6G. The leading bus assembly 7 in FIGS. 6B to 6H show the examples wherein the area of the contact zone of the retaining element is increased for enhancing the heat transfer. FIGS. 6D to 6F show the examples wherein the area of the leading bus 8 at the contact spot is enlarged to increase the heat transfer.

Figure 6G:
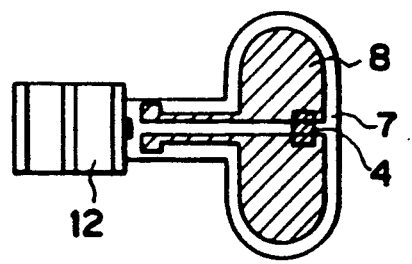
Figure 6H:
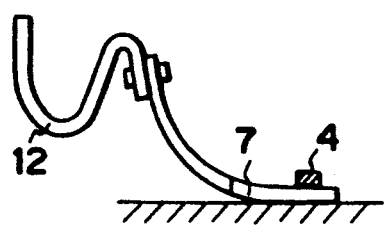

FIG. 6G and 6H show examples wherein the retaining element is not only the polyimide film itself but a combination of the film and the auxiliary element 12 which holds the polyimide film. In FIG. 6H, the structure of the auxiliary element 12 is illustrated as to hold the polyimide film with ease, but the structure of the auxiliary element is not limited to this case, and the element may be made of metal or plastics.

(C) The sensing element attached to retaining element

Figure 7:
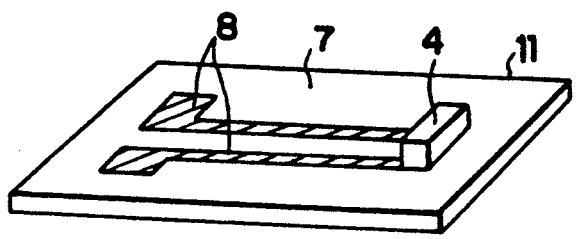
FIG. 7 is a schematic illustration of the sensing element attached to the retaining element.

FIG. 7 shows a schematic perspective illustration of the sensing element attached to the retaining element.

As shown in FIG. 7, the leading bus 8 of the flexible leading bus assembly 7 is connected to the electrodes, which are not shown, of the substrate 4 by reflow soldering. The polyimide film in this figure is made of an elastic material which functions as a plate spring and various structure can be formed by bending it as shown in FIGS. 1A to 1H.

(D) The sensing element

FIGS. 1A to 1H are shcematic illustrations of apparatus for the measurement of temperature of the present invention wherein the sensing element 4a is attached to the retaining element 31 and the retaining element is attached to the holding element 32 and the apparatus is softly contacted with the surface of the measured body 1, as shown in the embodiments shown in these figures. As shown in FIGS. 1A to 1D, the retaining element 31 is elastically bent and contacted with the top of the surface of the measured body 1 at the zone adjacent to the sensing element 4a with the area or the breadth of the contacting zone of the retaining element larger than those of the other non-contacting zone as shown in FIGS. 6D to 6G.

Figure 1A:
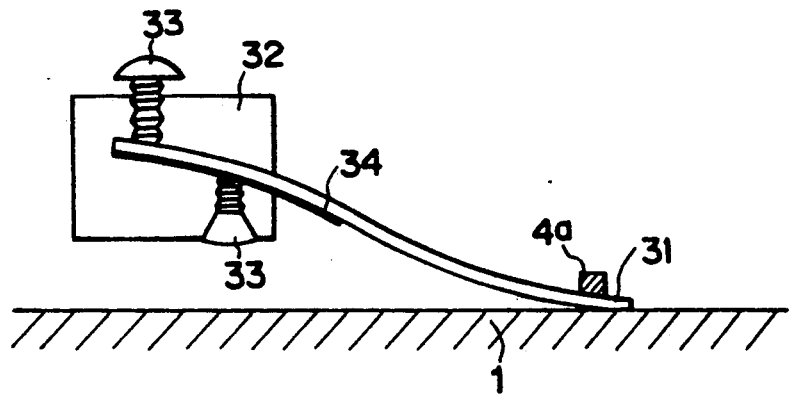
FIGS. 1A to 1H are schematic illustrations of the embodiments of this invention.
Figure 1B:
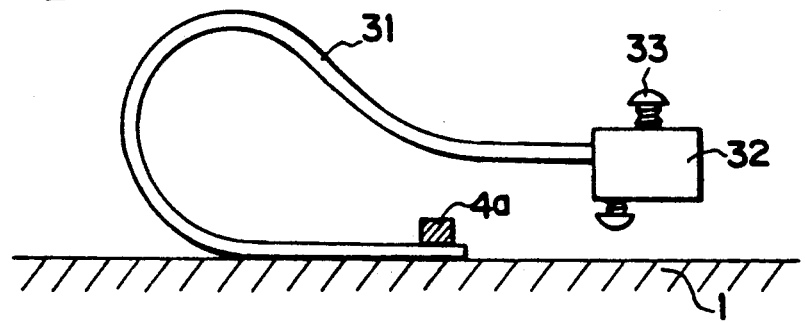
Figure 1C:
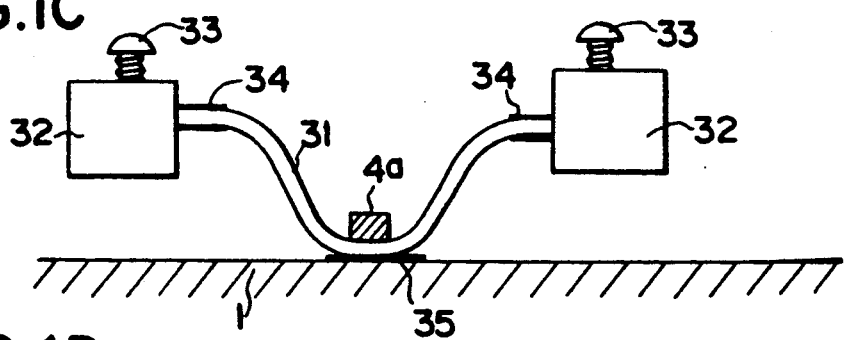
Figure 1D:
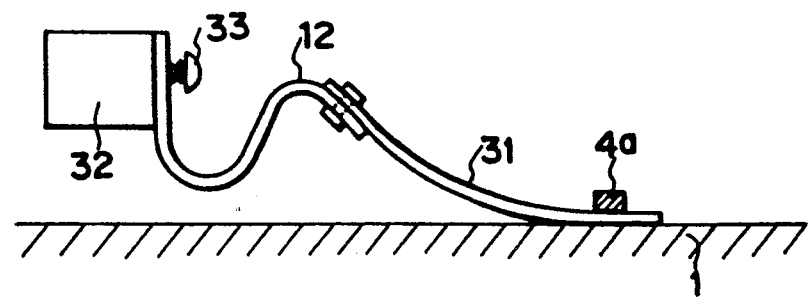

The contacting mechanism shown in FIGS. 1A to 1C comprises the screw 33 of the holding element 32 which attaches the retaining element 31 to the holding element 32, the retaining element 31, the elastic strength and the shape of the supporting element 34, and a positioning mechanism of the holding element 32, which is not shown. In FIG. 1D the auxiliary element 12 which is a part of the contacting mechanism as shown in FIG. 6G, e.g. made by forming a stainless strip, contributes to the realization of the pertinent contact.

The contacting mechanism is not limitted to those as shown in FIGS. 1A to 1H.

The indirect contacting may be done by inserting the polyimide sheet 35 between the retaining element 31 and the measured body 1, so that the gap between the retaining element and the measured body is in the range of from 0.2 to 0.3 mm, as shown in FIGS. 1C and 1E to 1G. In these Figures, the part 37 denotes the supporting element.

In these examples, the polyimide sheet 35 plays the role of maintaining the gap "d" as constant, the gap "d" being adjusted by laminating numbers of sheets.

However, when the contacting zone with the measured body is just beneath the sensing element as shown in FIG. 1C, the insertion of the polyimide sheet is not favorable since the insertion becomes a thermal barrier, and influences the responsiveness of the sensing element. For example, in case of an on-off control for the control of temperature to a certain target value having the warming up time of 35 seconds, the control amplitude is 8 degrees when the polyimide film is inserted beneath the sensing element, whereas it is 5 degrees when no insertion is made beneath the sensing element. Therefore the insertion of the polyimide film is not desirable, except when the parts adjacent to the contacting zone may be damaged or deformed.

Figure 1E:
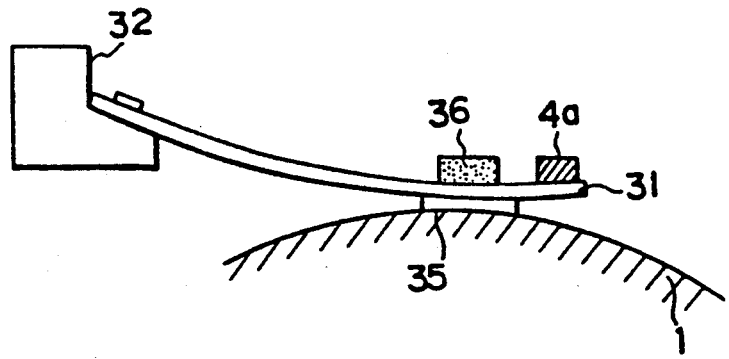
Figure 1F:
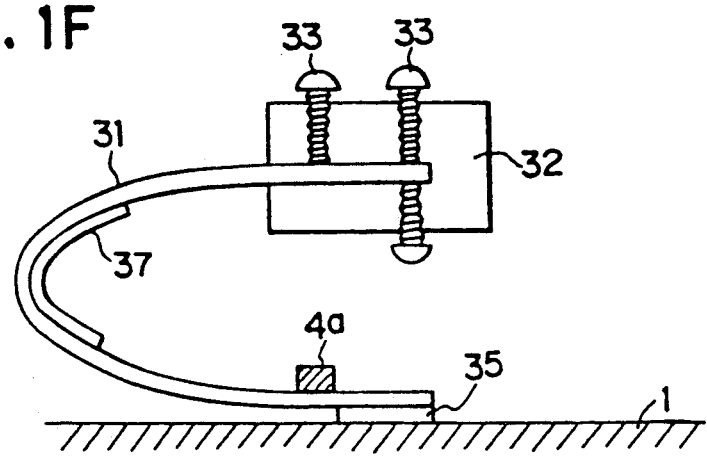
Figure 1G:
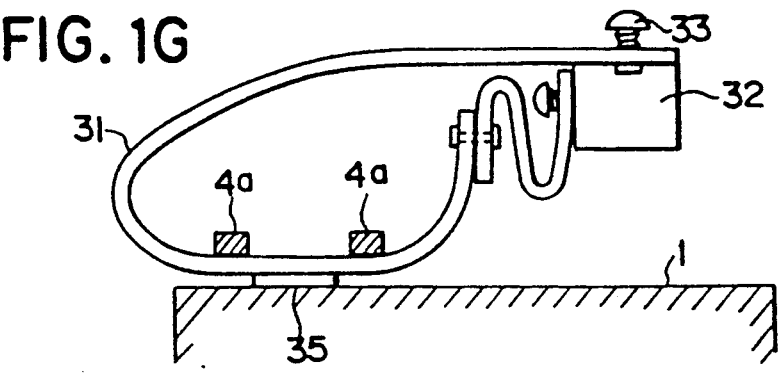
Figure 1H:
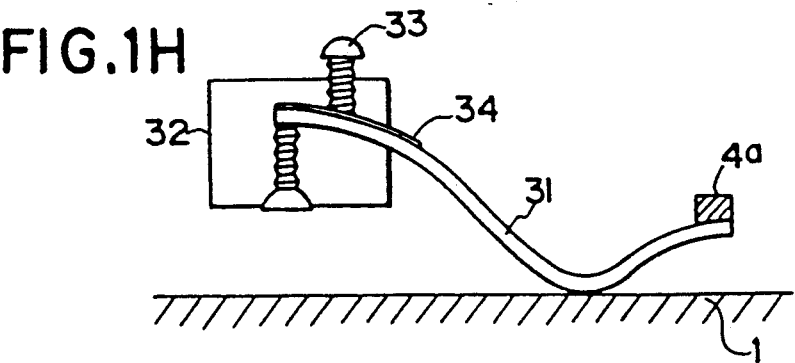
Figure 2A:
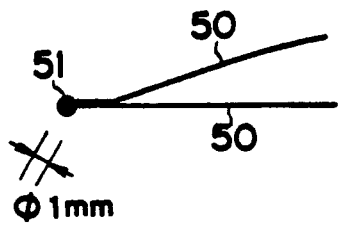
FIGS. 2A and 2B are schematic illustrations of the prior art.
Figure 2B:
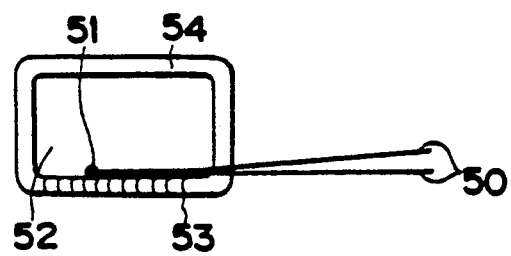

The polyimide film of the retaining element 31 may be directly contacted with the measured body as shown in FIG. 1H. When the weight of the film is not enough for good contact with the measured body, the weight 36 as shown in FIG. 1E may be attached to the film. Thus, good contact may be attained by the strong bending action using the holding part. At least two sensing elements 4A may be attached to the film and the simultaneous measurement at different locations becomes possible in the case shown in FIG. 1G.

In this invention, the type of the apparatus wherein the contact zone is situated beneath the sensing element as shown in FIGS. 1A to 1D, is classified as a soft contacting apparatus.

Among these soft contacting apparatus, the apparatus wherein the contacting spot is adjacent to the sensing element and enough heat transfer from the measured body to the sensing element is procured, as shown in FIGS. 1E to 1H, are called quasi-non-contacting apparatus.

Figure 8A:
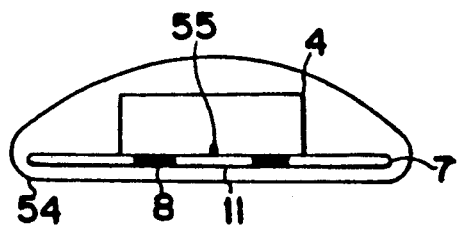
FIGS. 8A to 8C are schematic illustrations of the sensing element wrapped by polyimide tapes.
Figure 8B:
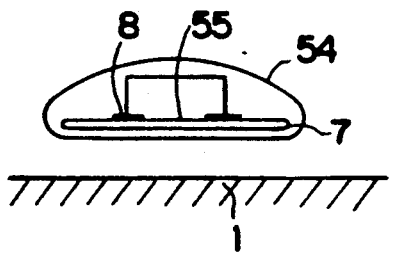
Figure 8C:
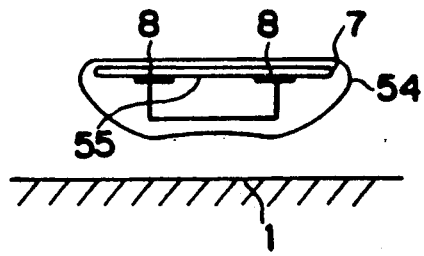

In the apparatus of the present invention, the substrate 4 may be attached to the flexible lead bus assembly 7 by wrapping the substrate with the polyimide tape 54 for the purpose of protection as shown in FIGS. 8A to 8C. In case of the quasi-non-contacting apparatus the example shown in FIG. 8B is superior to that shown in FIG. 8C in thermal responsiveness since the thermistor 55 faces the measured body. In case of FIG. 8B, with respect to the thermal responsiveness of the sensing element, the polyimide tape may not be necessary.

(E) Temperature measurement and temperature control device

Figure 9:
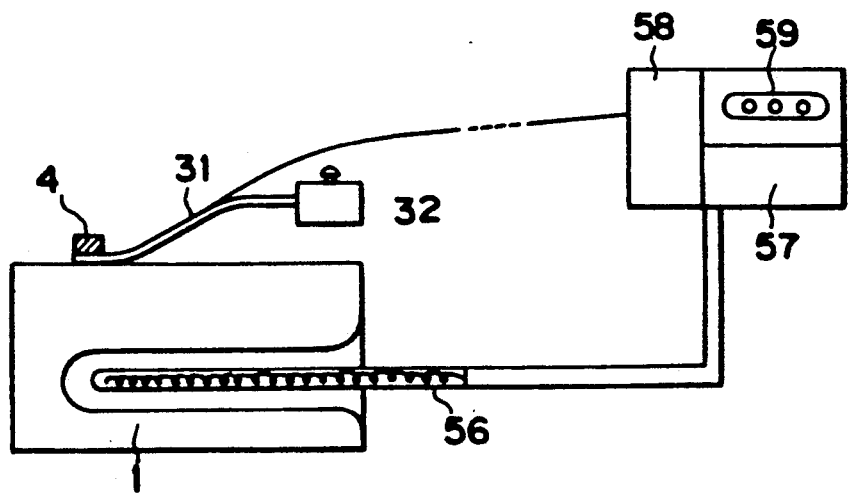
FIG. 9 is a schematic illustration of the temperature control system using the apparatus.

FIG. 9 is a schematic illustration wherein a system of temperature control comprises the apparatus for temperature measurement of this invention. In this figure the electric heater 56 of the measured body is controlled by the temperature control circuit 57, 58 is the temperature detection circuit, and 59 is the temperature display device.

The popular method of temperature measurement utilizes an electric thermometer with a sensing element such as a thermistor. The electrical circuit shown in FIG. 9 is similar to those of thermometers. The thermometer detects the change of the resistance of the thermistor, converting the change to that of frequency, memorizing the relationship between the frequency and the temperature by an integral circuit, and displaying the converted temperature.

The detection of the temperature is carried out by detecting the signal of the thermistor by the temperature detecting circuit 58, and the output of the circuit is inputted to the temperature display 59 or the temperature control circuit 57. By the output of the temperature the electric power of the electric heater 59 is regulated to maintain the temperature to a target value.

(F) The performance of the apparatus of this invention

As examples of this invention, the performances of the soft contacting apparatus shown in FIG. 1A, and the quasi-non-contacting apparatus in FIG. 1H are reported in the graphs of FIGS. 3 and 4A to 4D.

(F-1) The thermal responsiveness of the apparatus

Figure 3:
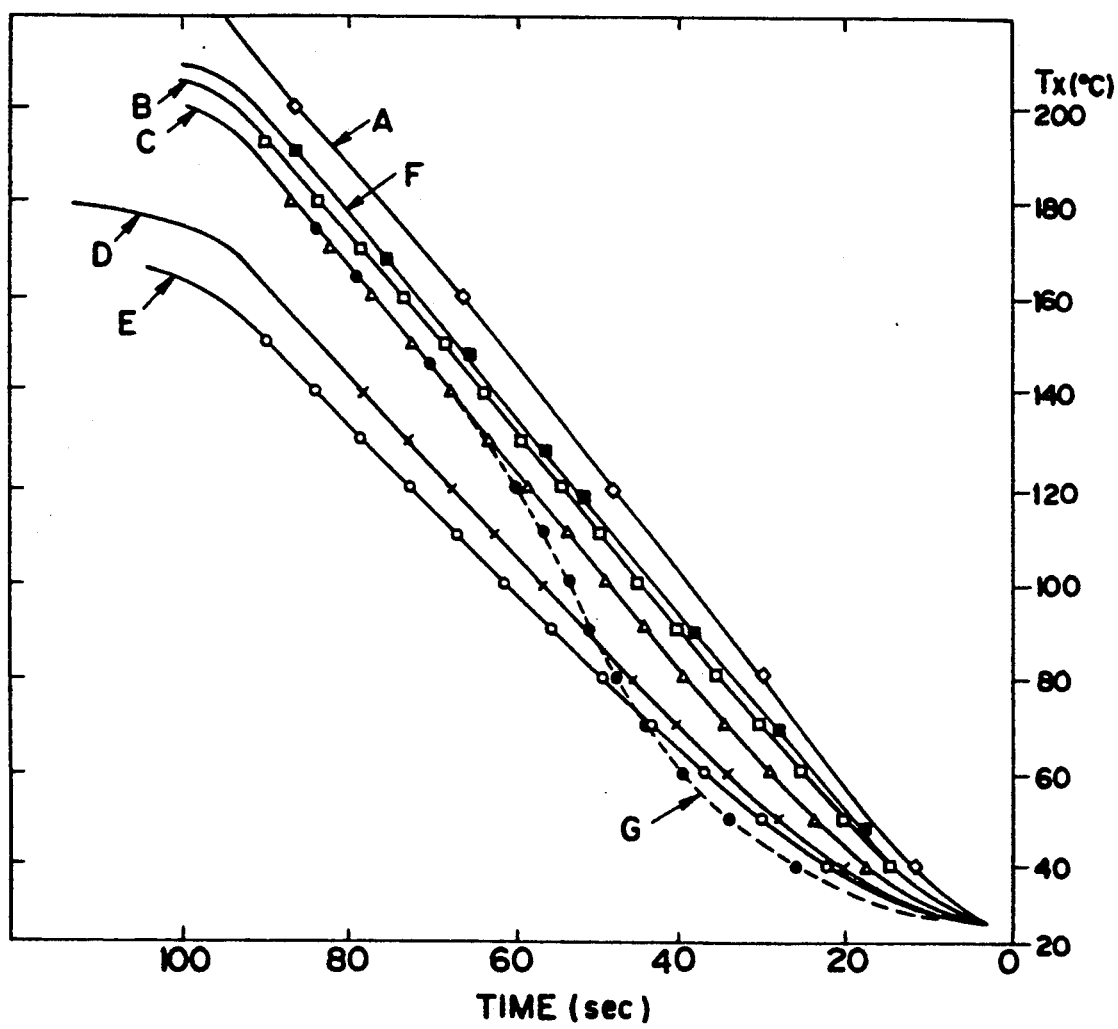
FIG. 3 is a graph showing the thermal responsiveness of various apparatuses.

FIG. 3 reports the timewise change of the detected value of the temperature $T_x$ at the surface of a thermally fixing roll of a copying machine after applying an electrical voltage of 130 volts, by using various apparatus of temperature measurement. In FIG. 3, the curve (A) is of the soft contacting apparatus of the invention, the curves (B) to (E), of the non-contacting apparatus, the curve (F), of the quasi-non-contacting apparatus of the invention, the curve (G), of the contacting apparatus of the prior art. FIG. 3 reports the following:

(1) The non-contacting apparatus of curves (B) and (C) wherein the gap between the sensing element and the measured body "d" is no more than 0.6 mm, are superior to those of curves (D) and (E) wherein the "d" is no less than 0.7 mm in thermal responsiveness. The smaller the gap "d", the larger the responsiveness.

However it is difficult to make the gap equal to or less than 0.2 mm.

(2) The contacting apparatus with a bead type thermistor of curve (G) is superior to those of curves (D) and (E) wherein the gap is no less than 0.7 mm, and equal to that of curve (C) wherein the gap is equal to 0.6 mm, in thermal responsiveness.

(3) The quasi-non-contacting apparatus of curve (F) wherein the gap is equal to 0.3 mm is superior to that of curve (C) in thermal responsiveness.

(4) The soft contacting apparatus of curve (A) is superior to those of the curves explained in(1), (2), and (3).

The superiority in thermal responsiveness is in the order of (A), (F), (B), (C), (G), (D), and (E).

(F-2) Overshooting in temperature regulation

Figures 4C, 4D:
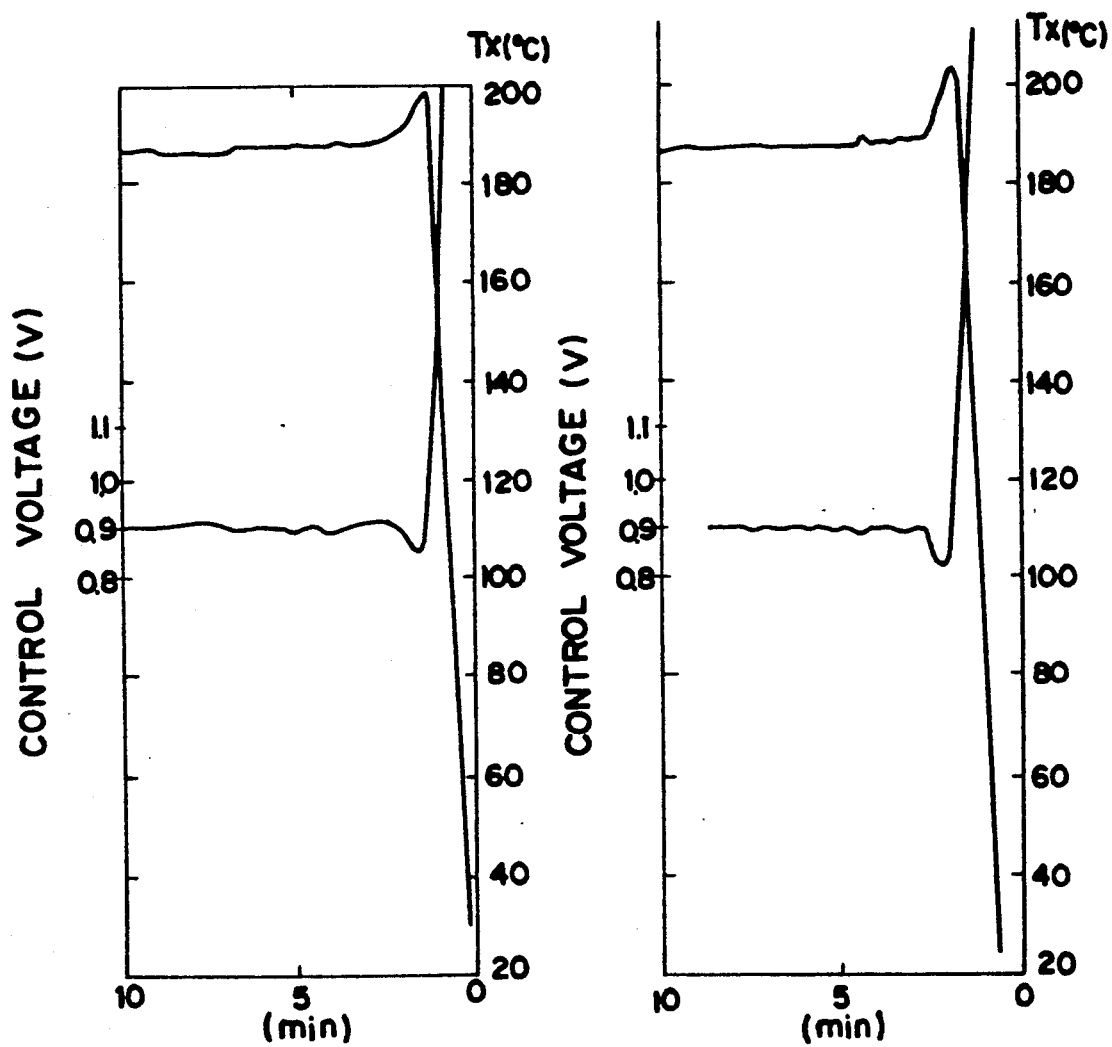

FIGS. 4A to 4D are the graphs showing the overshooting phenomena of the apparatus (C), (F), and (G) in FIG. 4., in the measurement of the surface temperature of the thermally fixing roll of the copying machine. FIG. 4A corresponds to the curve (A) of FIG. 3, 4B to the curve (F), 4C to the curve (C), and 4D to the curve (G).

FIGS. 4A to 4D report the results of the experiments wherein the temperature $T_x$ of the roll is measured by the apparatus and a control device regulates the temperature to a target value. The warming up time in this experiment is 75 seconds and the regulation is carried out by inputting pulse signals at an interval of 5 seconds.

According to FIGS. 4A to 4D, the smaller the thermal responsiveness compared with the soft contacting apparatus of this invention the larger the overshooting in the regulation of the control voltage and the surface temperature.

The overshooting is defined as the quantity wherein the peak value is reduced by the steady-state value.

Table 1 reports the overshooting of the surface temperature in relation to the warming up time.

TABLE 1

| Warming up Time (sec) | Contacting Type Sensor (Bead Type) | Non contacting Sensor Quantity of d | | | Quasi-Non-Contacting Sensor | Soft Contacting Type (Present Invention) |
|---|---|---|---|---|---|---|
| | | 0.3 mm | 0.6 mm | 0.9 mm | d = 0.3 mm | |
| 75 | 21 deg. | 11 deg. | 27 deg. | 40 deg. | 8 deg. | 5 deg. |

TABLE 1-continued

| | | Comparison of Overshooting | | | | |
|---|---|---|---|---|---|---|
| Warming up Time (sec) | Contacting Type Sensor (Bead Type) | Non contacting Sensor Quantity of d | | | Quasi-Non-Contacting Sensor d = 0.3 mm | Soft Contacting Type (Present Invention) |
| | | 0.3 mm | 0.6 mm | 0.9 mm | | |
| 120 | 11 deg. | 2 deg. | 11 deg. | 30 deg. | 2 deg. | 0 deg. |
| 300 | −3 deg. | −5 deg. | +4 deg. | 10 deg. | −5 deg. | −5 deg. |

According to the Table, the overshooting is the smallest in the soft contacting apparatus. The superiority in overshooting is in the order of the soft contacting apparatus, the non- contacting apparatus with d equal to 0.3 mm, the contacting apparatus, and the non-contacting apparatus with d equal to 0.6 mm. By the explanation from (A) to (F), the performance of the soft contacting apparatus and the quasi-non-contacting apparatus of the present invention on the enhancement of the quick responsiveness and the reduction of the overshooting is confirmed.

(G) The location of the sensing element of the apparatus

The embodiments of this invention, soft contacting apparatus and quasi-non-contacting apparatus, are shown in schematic illustrations, FIGS. 10A, 10B, 11, 12A, and 12B.

Figure 10A:
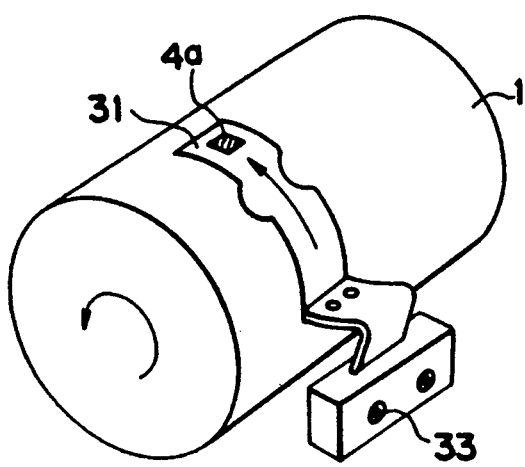
FIGS. 10A, 10B, 11, 12A, and 12B are schematic illustrations of the apparatus attached to the measured body.
Figure 10B:
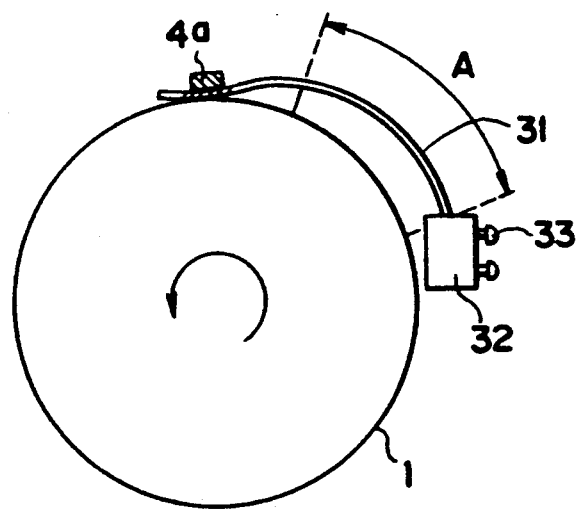
Figure 11:
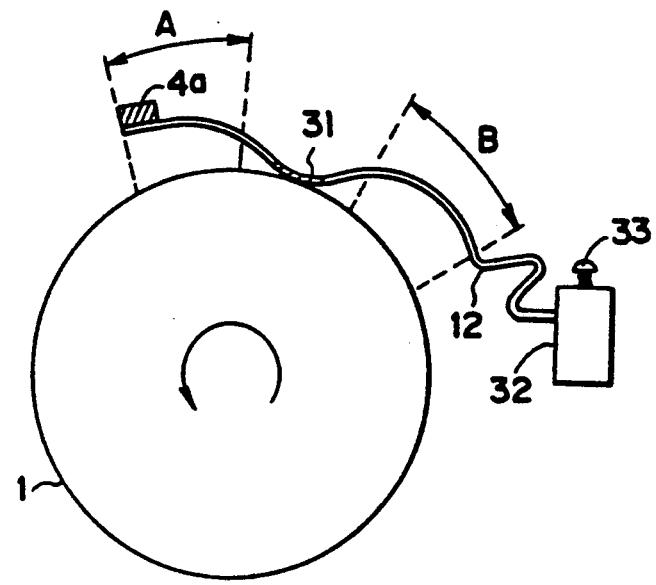
Figure 12A:
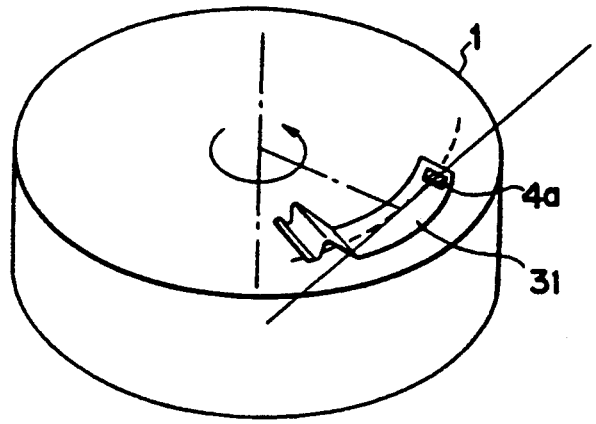
Figure 12B:
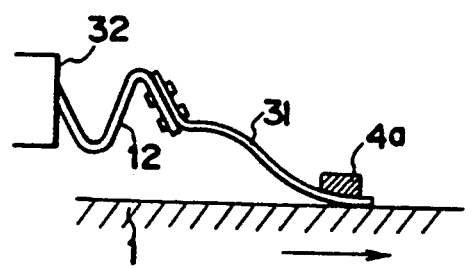

In FIGS. 10A, 10B, and 11, the measured bodies are rotating cylindrical ones, and the measuring apparatus are soft contacting and quasi-non-contacting ones which contact at the round surface of the measured body. In FIGS. 12A and 12B, the measured body is a rotating cylindrical one, and the soft contacting apparatus contacts at the end of the measured body.

(G-1) When the measuring spot of the measured body 1 is of a round surface as shown in 10A, the perspective view and in 10B, the side view., the direction of the retaining element 31 made of a polyimide film is perpendicular to that of the axis of the body. The distance between the film and the body is about the same in the zone other than the contacting one as denoted by A in the figure, which is arranged in consideration of the heat transfer efficiency of the sensing element 4A. When the measured body is the thermally fixing roll of the copying machine, the sensing element is attached at the opposite side of the spot of the roll where papers pass beneath the roll so as not to interfere with the operation. The apparatus in FIGS. 10A and 10B are the soft contacting ones. This is the most general case in the measurement of rotating cylindrical bodies. When the apparatus is the quasi-non-contacting one as shown in FIG. 11, the middle part of the retaining element 31 is the contacting zone, and at the zone other than the contacting one denoted as A and B, the film is approximately parallel to the round surface of the measured body.

(G-2) When the apparatus is contacted to the end surface of a rotating body as shown in FIGS. 12A and 12B, the direction of the retaining element 31, a polyimide film is about parallel to the circumferential direction denoted by the line 1 in the figure, which is in consideration of the heat transfer efficiency. As in the case of G-1, the sense of the direction from the holding element to the sensing element is the same with the downward side of the rotation, which is in consideration of evading damage to the apparatus.

(G-3) When the soft contacting apparatus is contacted to the high speed rotating body, the air adjacent to the body becomes a lubricant, and the contact is weakened which can evade the increase of the coefficient of friction and the damage of the part of the apparatus. Moreover the retaining element is floated up by the dynamic pressure of the air which enables the good performance of the measurement since the phenomena makes the soft contacting apparatus similar to the non contacting ones.

Figure 13A:
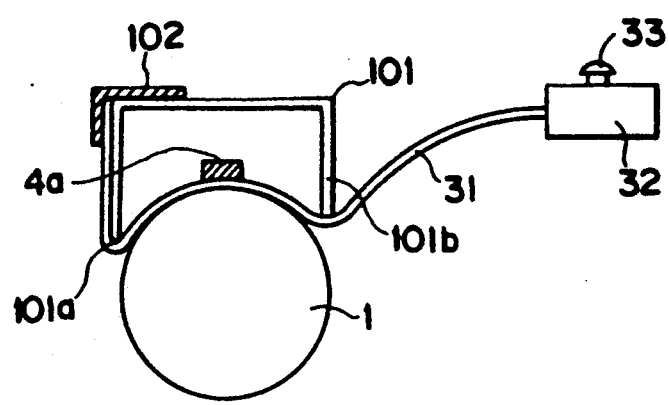
FIGS. 13A and 13B are schematic illustrations of the pressing mechanism.
Figure 13B:
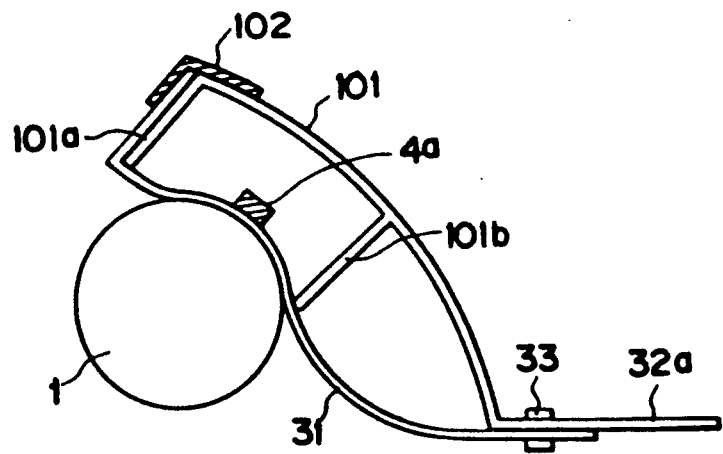

(H) The pressing mechanism of the sensing element (H-1) FIGS. 13A and 13B are schematic illustrations wherein embodiments of the pressing mechanism of the sensing element are shown. In FIG. 13A a pressing frame is attached to the retaining element, whereas in FIG. 13B the pressing frame and the retaining element are formed as a single element.

In FIG. 13A the inverse U-shaped frame 101 comprising the pressing arms 101a and 101b is attached to the retaining element 31 by the polyimide tape 102.

By adjusting the position of the holding element 32, the zone of the retaining element where the sensing element 4a is placed, is softly contacted to the measured body 1 and heat is transferred from the measured body to the sensing element through the polyimide film of the retaining element 31 by which the measurement of the temperature is carried out.

In FIG. 13B the inverse F shaped pressing frame 101 comprising the pressing arms is attached to the retaining element 31 by the polyimide tape 102, and of which other end 32a is engaged with the retaining element 31 by the screw 33, whereby the pressing frame and the retaining element are formed as a single element.

Figure 14A:
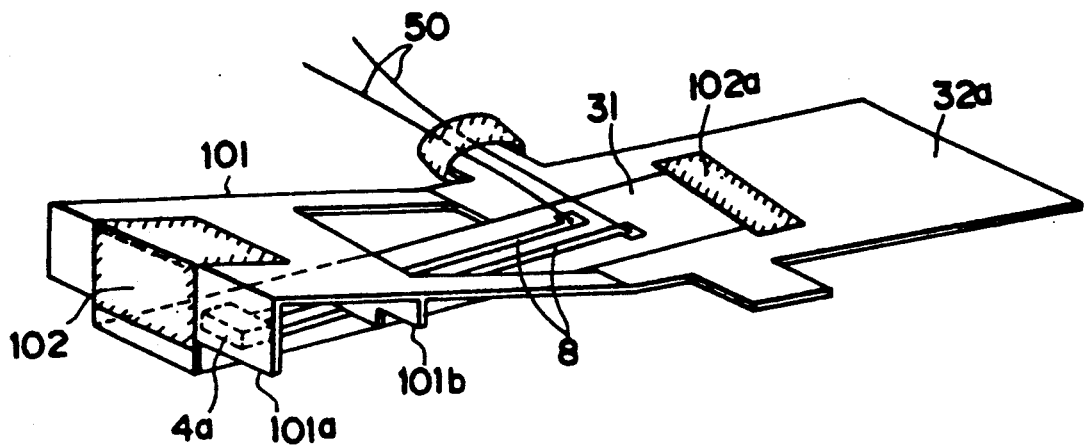
FIGS. 14A, 14B, and 15 are schematic illustrations of the pressing mechanism.
Figure 14B:
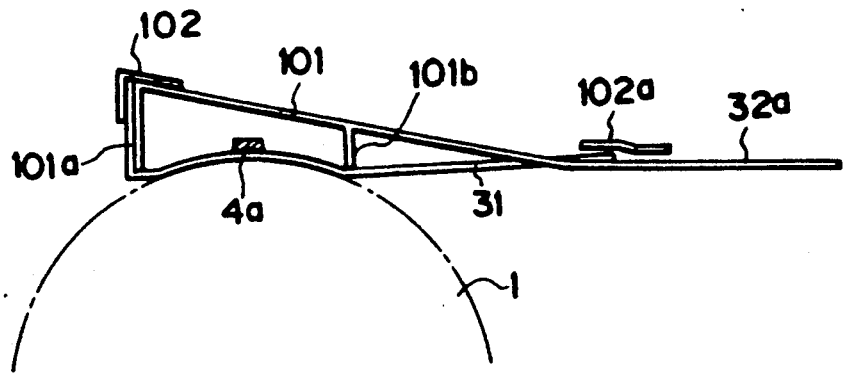

(H-2) FIGS. 14A and 14B are the schematic illustration of an embodiment of the invention, wherein FIG. 14A is the perspective view and FIG. 14B is the side view. In these figures the pressing frame 101 and the retaining element 31 are engaged by the polyimide tape 102 and 102a to make up a single element.

The sensing element is softly contacted to the measured body in the similar manner as in FIGS. 13A and 13B.

Figure 15:
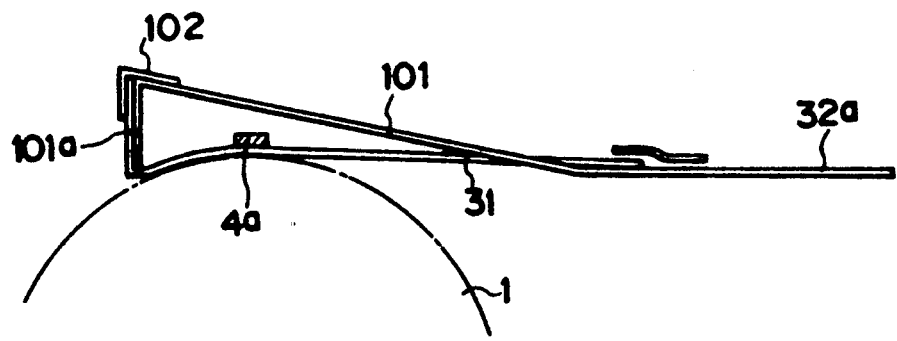

(H-3) FIG. 15 is a schematic illustration of an embodiment of the invention, wherein the pressing frame is shaped as the arabic numeral 7 with the single pressing arm 101a attached to the retaining element 31 by the polyimide film 102.

This structure is similar to those in FIG. 14A and 14B, but the contact of the sensing element is softer than in case of FIG. 14B.

The reason for the adoption of the aforementioned pressing frame is as follows:

① The insertion of the polyimide film 35 between the contact part of the retaining element 31 and measured body, as explained in (D), is not preferable.

In the cases wherein no insertion is made and the retaining element directly contacts with the measured body, the retaining element may be deformed by cooling down from an elevated temperature and good contact may not be maintained in case that the measured body is rotating or the surface of the body is rugged.

(2) Accordingly this unfavorable contact may lead to an error in the measurement value, and hence to the malfunction of the control system.

The above mentioned problems are solved by utilizing the pressing frame which presses the contact part of the retaining element by a constant force. However these embodiments do not limit the scope of the invention.

Comparison is made between the cases in FIGS. 13A, 13B, 14A wherein the pressing arm is dual, and the case in FIG. 15, wherein the pressing arm is single, concerning the controllability of the temperature. The control system is of a simple on-off control of temperature to a target value with a warming up time of 35 seconds. The result of the experiment in control amplitude is 5 degrees in the case of the dual arms, whereas in the case of the single arm the amplitude is 20 degrees, which proves the good performance of the pressing mechanism.

What is claimed is:

1. A temperature measurement apparatus, comprising:
    sensing means for detecting a temperature of a surface of a body to be measured, said sensing means being placed adjacent to said body to be measured;
    retaining means for retaining said sensing means, said retaining means comprising a thermally conductive and electrically insulative material, at least a portion of said retaining means comprising elastic material;
    holding means for holding said retaining means; and
    a contact mechanism for causing a contact zone of said retaining means to slightly elastically contact said surface of said body to be measured through elasticity of said elastic material of said retaining means, said contact mechanism being coupled to said retaining means and to said holding means.

2. The temperature measurement apparatus of claim 1, wherein said contact mechanism contacts said contact zone of said retaining means to a top surface of the body to be measured by means of a contact load of about 5 gr or less.

3. The temperature measurement apparatus of claim 1, wherein said retaining means comprises a thermally conductive and electrically insulative sheet.

4. The temperature measurement apparatus of claim 1, wherein said sensing means is arranged on said retaining means and the contact zone of the retaining means just under the sensing means contacts the surface of the body to be measured.

5. The temperature measurement apparatus of claim 1, wherein said sensing means comprises a thin film thermistor formed on an electrically insulating layer of a substrate.

6. A temperature measurement apparatus, comprising:
    sensing means for detecting a temperature of a surface of a body to be measured, said sensing means being placed adjacent to said body to be measured;
    retaining means for retaining said sensing means, said retaining means comprising a thermally conductive and electrically insulative material, at least a portion of said retaining means comprising elastic material;
    holding means for holding said retaining means; and
    a contact mechanism for causing a contact zone of said retaining means to elastically and slightly contact said surface of said body to be measured through elasticity of said elastic material of said retaining means, said contract mechanism being coupled to said retaining means and to said holding means; and
    wherein said retaining means comprises a polyimide film and a flexible copper leading foil formed on said polyimide film, said flexible copper leading foil being connected to electrodes of said sensing means.

* * * * *

UNITED STATES PATENT AND TRADEMARK OFFICE
CERTIFICATE OF CORRECTION

PATENT NO. : 5,213,417
DATED : May 23, 1993
INVENTOR(S) : YAMADA et al

It is certified that error appears in the above-indentified patent and that said Letters Patent is hereby corrected as shown below:

Column 1, line 31, "a"  should be  --the--.

Column 1, line 32, "the" (first occurrence) should be --a--.

Column 3, line 52, "as"  should be  --and--.

Column 6, line 38, delete "the" (first occurrence).

Column 6, line 39 and 40, delete "(C), (F), and (G) in FIG. 4.,"

Signed and Sealed this

Third Day of June, 1997

*Attest:*

BRUCE LEHMAN

*Attesting Officer*      *Commissioner of Patents and Trademarks*